(12) United States Patent
Cerny

(10) Patent No.: US 9,170,465 B2
(45) Date of Patent: Oct. 27, 2015

(54) THERMOCHROMIC WINDOW AND METHOD OF MANUFACTURING THE SAME

(71) Applicant: Guardian Industries Corp., Auburn Hills, MI (US)

(72) Inventor: Glenn A. Cerny, Canton, MI (US)

(73) Assignee: Guardian Industries Corp., Auburn Hills, MI (US)

(*) Notice: Subject to any disclaimer, the term of this patent is extended or adjusted under 35 U.S.C. 154(b) by 48 days.

(21) Appl. No.: 13/684,797

(22) Filed: Nov. 26, 2012

(65) Prior Publication Data

US 2014/0146382 A1    May 29, 2014

(51) Int. Cl.
| | |
|---|---|
| *G02F 1/01* | (2006.01) |
| *G02F 1/15* | (2006.01) |
| *B32B 17/10* | (2006.01) |
| *C03C 17/42* | (2006.01) |
| *B82Y 20/00* | (2011.01) |

(52) U.S. Cl.
CPC ............. *G02F 1/15* (2013.01); *B32B 17/10036* (2013.01); *B32B 17/10045* (2013.01); *B32B 17/10477* (2013.01); *B32B 17/10614* (2013.01); *B32B 17/10761* (2013.01); *B32B 17/10798* (2013.01); *C03C 17/42* (2013.01); *B82Y 20/00* (2013.01); *C03C 2217/445* (2013.01); *C03C 2217/475* (2013.01); *C03C 2217/48* (2013.01); *C03C 2217/70* (2013.01); *C03C 2217/91* (2013.01); *C03C 2217/94* (2013.01); *Y10T 29/49083* (2015.01)

(58) Field of Classification Search
CPC ..... G02F 1/0147; G02F 1/132; G02F 1/0126; G02F 1/19; G02F 1/01; G02F 1/133514

USPC .......................................... 359/288, 290–299
See application file for complete search history.

(56) References Cited

U.S. PATENT DOCUMENTS

| | | | |
|---|---|---|---|
| 3,438,022 A * | 4/1969 | Teeg et al. ..................... | 345/106 |
| 4,400,412 A | 8/1983 | Scanlon et al. | |
| 5,557,462 A * | 9/1996 | Hartig et al. .................. | 359/585 |

(Continued)

FOREIGN PATENT DOCUMENTS

EP          1 160 214        12/2001

OTHER PUBLICATIONS

"Enhanced Chemical Stability of $VO_2$ Nanoparticles by the Formation of $SiO_2/VO_2$ Core/Shell Structures and the Application to Transparent and Flexible $VO_2$-based Composite Foils with Excellent Thermochromic Properties for Solar Heat Control", Gao et al., Energy & Environmental Science, 2012, 5, pp. 6104-6110, May 2012.

"VO2 Foils Eyed for Mass Production for Thermochromic Window Applications", Wray; Ceramic Tech Today, ACerS Ceramic Materials, Applications & Business Blog, Feb. 7, 2012.

(Continued)

*Primary Examiner* — Scott J Sugarman
*Assistant Examiner* — Vipin Patel
(74) *Attorney, Agent, or Firm* — Nixon & Vanderhye P.C.

(57) ABSTRACT

A thermochromic window, including: a first glass substrate, a transparent conductive film applied to the first glass substrate, a silicone resin layer applied to the conductive film, a second glass substrate, and a power source which supplies power to the conductive film, the silicone resin layer including vanadium oxide (e.g., $VO_2$) nanoparticles which are encapsulated in a silica inclusive (e.g., $SiO_2$) shell.

19 Claims, 3 Drawing Sheets

(56) References Cited

U.S. PATENT DOCUMENTS

| | | | |
|---|---|---|---|
| 6,039,390 A * | 3/2000 | Agrawal et al. | 296/211 |
| 6,084,702 A | 7/2000 | Byker et al. | |
| 7,817,328 B2 | 10/2010 | Millett et al. | |
| 8,154,788 B2 | 4/2012 | Millett et al. | |
| 2008/0055701 A1* | 3/2008 | Liu et al. | 359/266 |
| 2008/0166506 A1* | 7/2008 | Shin et al. | 428/29 |
| 2012/0161431 A1* | 6/2012 | Vulpius et al. | 283/85 |

OTHER PUBLICATIONS

International Search Report mailed Apr. 14, 2014.

"Self-Bonding & Self-Lubricating Silicone Compounds"; Silcotec Inc.: "Sileotec News". Feb. 5, 2012 (1page).

"Control of Thermochromic Spectrum in Vanadium Dioxide by Amorphous Silicon Suboxide Layer"; Kakiuchida et al., Solar Energy Materials and Solar Cells, 92 (2008) pp. 1279-1284.

* cited by examiner

THERMOCHROMIC WINDOW AND METHOD OF MANUFACTURING THE SAME

This application relates to a thermochromic window and method of manufacturing the same, specifically a thermochromic window which includes vanadium dioxide ($VO_2$) nanoparticles which have been encapsulated in a silicon dioxide ($SiO_2$) shell and/or treated with silane coupling agent(s), and provided in a silicone resin.

BACKGROUND

Smart windows are designed to reduce the cost of heating, air conditioning and/or lighting. Issues with levels of transmission, haze, degradation over time, and/or high material and processing costs have limited the use of these windows to date.

Thermochromic windows reduce energy costs by transforming from a transmitting state while at low temperature to a reflecting state at high temperatures while substantially maintaining significant visible transmittance, Vanadium Dioxide ($VO_2$) nanoparticles transition from (i) an insulating, monoclinic form $VO_2(M)$, while at low temperatures, to (ii) a metallic or substantially metallic, rutile form $VO_2(R)$ at high temperatures. Because this metal-to-insulator transition is reversible and occurs near room temperature, $VO_2$ nanoparticles could be used in films on glass for smart windows.

$VO_2$ nanoparticles, however, are highly reactive. The chemical instability of $VO_2$ nanoparticles limits their use in mass production environments. In particular, $VO_2$ nanoparticles have been found to fail under acidic conditions and to oxidize to $V_2O_5$ in dry air.

In a related art method, coating $VO_2$ nanoparticles with a silicon dioxide ($SiO_2$) shell was found to significantly improve the anti-oxidation and acid resisting properties of $VO_2$. See Gao, Y., et al., "Enhanced chemical stability of $VO_2$ nanoparticles by the formation of $SiO_2/VO_2$ core/shell structures and the application to transparent and flexible $VO_2$-based composite foils with excellent thermochromic properties for solar heat control," *Energy Environ. Sci.*, 2012, 5, 6104-6110;

However, this related art fails to disclose a thermochromic window using $VO^2$ nanoparticles in a $SiO_2$ shell which is scalable to accommodate large-area production. See Wray, P., "VO2 foils eyed for mass production for thermochromic window applications," *Ceramic Tech Today*, Feb. 7, 2012, wherein Yanfeng Gao, the paper's lead author, "says scaling the group's technique to large-area production is the next challenge." Additionally, there is a need for a thermochromic window, and method of manufacturing the same, which provides good energy efficiency and/or visible transmittance, and/or lowers the manufacturing cost, of thermochromic windows.

SUMMARY

In certain example embodiments of this invention, there is provided a thermochromic window comprising: a first substrate; a transparent conductive film on the first substrate; a laminating layer comprising insulating material, the laminating layer further including nanoparticles comprising vanadium which are encapsulated and/or substantially encapsulated in a shell; and a second substrate, wherein the transparent conductive film and the laminating layer are located between the first and second substrates.

According to an aspect of exemplary embodiments, there are provided vanadium dioxide ($VO_2$) nanoparticles encapsulated in a silicon dioxide ($SiO_2$) shell treated with silane coupling agents and incorporated into a silicone resin.

According to an aspect of exemplary embodiments, there is provided a first glass substrate, a conductive film, a silicone resin layer including the encapsulated $VO_2$ nanoparticles in the silicone resin, and a second glass substrate. A power source may be connected to the conductive film which enables resistive heating of the encapsulated $VO_2$ nanoparticles. When heated, the encapsulated $VO_2$ nanoparticles transition from an insulator to metallic or substantially metallic and block at least some infrared (IR) rays. In other words, the layer including the silicone resin and $VO_2$ nanoparticles blocks significant more (e.g., at least 10% more, more preferably at least 20% more, and possibly at least 40% or 50% more) IR radiation when sufficiently heated compared to when not sufficiently heated.

According to an aspect of other exemplary embodiments, there is provided a method of manufacturing a thermochromic window, the method including encapsulating or substantially encapsulating $VO_2$ nanoparticles in a $SiO_2$ inclusive shell to form encapsulated or substantially encapsulated $VO_2$ nanoparticles, providing the encapsulated $VO_2$ nanoparticles in a silicone inclusive resin, applying a transparent conductive film on the first glass substrate, applying the silicone resin on the first glass substrate over at least the transparent conductive film, and laminating a second glass substrate to the first glass substrate so that at least the silicone resin inclusive layer is between the first and second glass substrates, and connecting a power supply to the conductive film, the power supply for supplying power to the conductive film for heating the silicone resin inclusive layer.

DETAILED DESCRIPTION OF EXEMPLARY EMBODIMENTS

Figure 1:
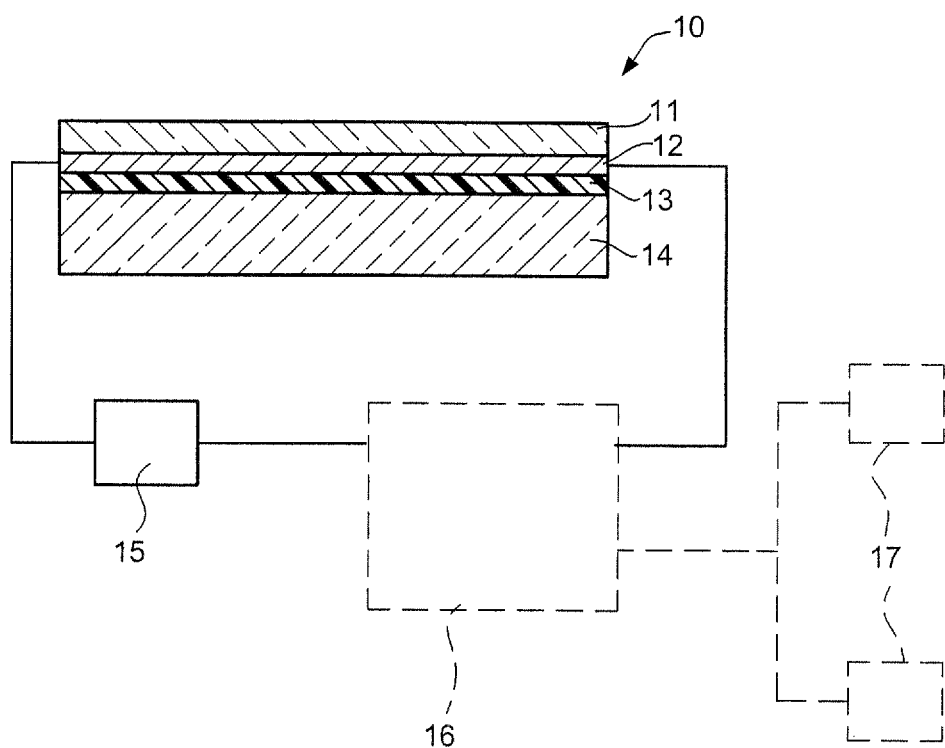
FIG. 1 is a diagram which illustrates a thermochromic window, according to exemplary embodiments.

A detailed description of exemplary embodiments is provided with reference to the accompanying drawings. Like reference numerals indicate like parts throughout the drawings.

FIG. 1 is a diagram which illustrates a thermochromic window 10, according to exemplary embodiments.

Referring to FIG. 1, thermochromic window 10 includes a first glass substrate 11, a transparent conductive film 12, a layer 13 of or including silicone resin, a second glass substrate 14, and a power source 15. Power source may be AC or DC. In some exemplary embodiments, thermochromic window 10 may include a controller 16, and one or more sensors 17. In certain example embodiments, the window 10 may have a visible transmission of at least about 30%, more preferably of at least about 40%, even more preferably of at least about 50% or 60%, before and/or after the vanadium dioxide ($VO_2$) inclusive nanoparticles in silicone layer 13 transition from (i) an insulating, monoclinic form $VO_2(M)$ while at low temperatures to (ii) a metallic or substantially metallic rutile form $VO_2(R)$ at high temperature.

Silicone resin layer 13 includes $VO_2$ nanoparticles which are encapsulated or substantially encapsulated with at least SiO2. In certain example embodiments, the nanoparticles may be treated with silicon contain material(s) such as TEOS and/or the like, in order to encapsulate them in a silica inclusive and/or based coating. The coated nanoparticles may then be treated with silane coupling agent(s) in order to allow adequate dispersion within the silicone resin. Lacking such silane coupling agent(s), the nanoparticles may be prone to agglomeration and significantly unequal distribution within the silicone resin. Power source 15 is electrically connected to transparent conductive film 12. As power is supplied to conductive film 12, conductive film 12 (which is preferably immediately adjacent and contacting the silicone layer 13) heats silicone layer 13 including the $VO_2$ nanoparticles therein. As $VO_2$ nanoparticles in silicone layer 13 are heated, they transition from an IR transmitting state at low temperature to a more IR reflecting state at high temperatures while substantially maintaining visible transmittance. Accordingly, silicone resin layer 13 is used to block infrared rays that would otherwise penetrate the window when the nanoparticles have been heated and are in an IR reflecting state. The infrared transmission of thermochromic window 10 may be variably adjusted by adjusting the amount of power supplied by power source 15 to conductive film 12. Conductive film 12 may be electrically connected to power source 15 through the framing (not pictured) of thermochromic window 10, bus bar(s), or the like.

During manufacture of thermochromic window 10, the concentration of $VO_2$ nanoparticles in silicone resin layer 13 may be varied depending on the desired level of infrared blocking. $VO_2$ nanoparticle distribution may also be a gradient (continuous or discontinuous) with higher concentrations near conductive film 12, enabling faster heating of the $VO_2$ nanoparticles and a lower overall temperature of thermochromic window 10 when additional IR blocking/reflection is desired. The greater the distance between the $VO_2$ nanoparticles in layer 13 and second glass substrate 14 also lowers the temperature of second glass substrate 14, which is another reason the concentration of the nanoparticles in layer 13 may be graded so that they are more concentrated in a portion of layer 13 closer to conductive film 12. In other words, the concentration of nanoparticles in layer 13 may be graded so that a majority of the nanoparticles in layer 13 are closer to conductive film 12 than to glass substrate 14.

Transparent conductive film 12 is located on (directly or indirectly) glass substrate 11. Thus, "on" as used herein includes both directly on and contacting, as well as indirectly on with other layer(s) therebetween. Transparent conductive film 12 may be of or including a transparent conductive oxide such as indium-tin-oxide (ITO), tin oxide, silver such as TG 15, or the like, and is for substantially uniformly heating the nanoparticles in the silicone layer 13 across first glass substrate 11 when power is supplied thereto from power source 15. In the manufacture of the window, conductive film 12 is coated with silicone resin layer 13 which includes the nanoparticles.

A silane coupling agent typically includes a hydrolysable group (for example alkoxy, acyloxy, halogen, amine, etc.), a silicon atom(s), a liker $(CH2)n$, and a nonhydrolyzable organic radical. Silane coupling agents form a durable bond between organic and inorganic materials. Using an appropriate silane coupling agent increases the processability of $VO_2$ nanoparticles, and may also be used in the process of encapsulating or substantially encapsulating the nanoparticles in a silica inclusive coating. Optimal silane coupling agent(s) can assist in the process of mixing and embedding nanoparticles with a silicone resin matrix.

Silicone resin layer 13 may be of or include one or more silicone resins (for example, $Me_3SiO$, $Me_2SiO_2$, $MeSiO_3$, etc.). Ideally, the silicone resin is highly transparent and thermally tolerant. High transparency provides maximum visibility to a user of thermochromic window 10. High thermal tolerance provides the material with the ability to withstand the high temperatures needed to trigger the thermochromic behavior of the $VO_2$ nanoparticles. The silicone resin ideally has good antifoaming properties which reduces air entrapment during nanoparticle mixing.

Incorporating encapsulated $VO_2$ nanoparticles in silicone resin layer 13 provides a number of benefits. For example, silicone resin has sufficient thermal properties to withstand the heating necessary to enable thermochromic behavior of $VO_2$ nanoparticles. While the exact temperature required for metal-to-insulator transition of $VO_2$ nanoparticles appears to be movable depending on size of the particle, silicone resin can often withstand heating to at least about 70° C. while maintaining excellent optical properties and without significant yellowing with age. In certain example embodiments, the power source is manipulated in order to provided resistive heating of the transparent conductive film 12 which heats the nanoparticles in the silicone inclusive layer 13 to at least about 68 degrees C., more preferably to at least about 70 or 75 degrees C., in order to cause the vanadium oxide inclusive nanoparticles in the silicone layer to transform from a monoclinic form which is substantially insulating to a rutile form which is substantially IR reflecting, in order to block more IR radiation.

Silicone resin also provides excellent bonding with the encapsulated nanoparticles because the matrix is similar to the $SiO_2$ shell of the encapsulated $VO_2$ nanoparticles. This ensures that thermochromic glass window 10 provides long term protection from infrared rays when desired. Silicone resin also bonds well with glass, which prevents the separation of second glass substrate 14 in the laminated window structure.

Silicone resin also has low thermal conductivity which enables the temperature of second glass substrate 14 to be reduced in comparison to first glass substrate 11 in certain example embodiments, making the glass window safer. Silicone resin is both ultraviolet (UV) tolerant and provides sound dampening.

Power supplied by power supply 15 may vary depending on the desired reduction of infrared transmission.

The electrical connection between power supply 15 and conductive film 12 may be a direct connection or through one or more intermediary elements. Thermochromic window 10 may include controller 16 which controls/varies the application of power from power supply 15 to conductive film 12 to control the level of infrared transmission. Controller 16 may include one or more processors, memory, logic gates, amplifiers, transistors, switches, dials, etc. (not shown). Controller 16 may execute instructions stored in a computer readable storage medium (not shown).

Controller 16 may be programmable during manufacture and/or by the end user. Controller 16 may, for example, be programmed to provide different levels of infrared reduction at different times of day.

Controller 16 may include one or more sensors 17 (for example, temperature sensors). Sensors 17 may sense, for example, the temperature of one or more of first glass substrate 11, conductive film 12, silicone resin layer 13, second glass substrate 14 and/or the environment on either side of thermochromic window 10. Sensors 17 may be used by controller 16 to provide more finite control of the heating of conductive film 12 and/or the level of infrared reduction.

Thus, the amount the transparent conductive film 12 is heated may be based upon the temperature(s) detected by one or more of the sensor(s) 17. In another example, temperature readings from sensors 17 may be used by controller 16, for example, to offset solar heating which may take place during the daytime hours.

For at least these reasons, thermochromic window 10 may provide effective and controllable thermochromic reduction of infrared rays in a package that is both easy to manufacture and safe to operate.

Figure 2:
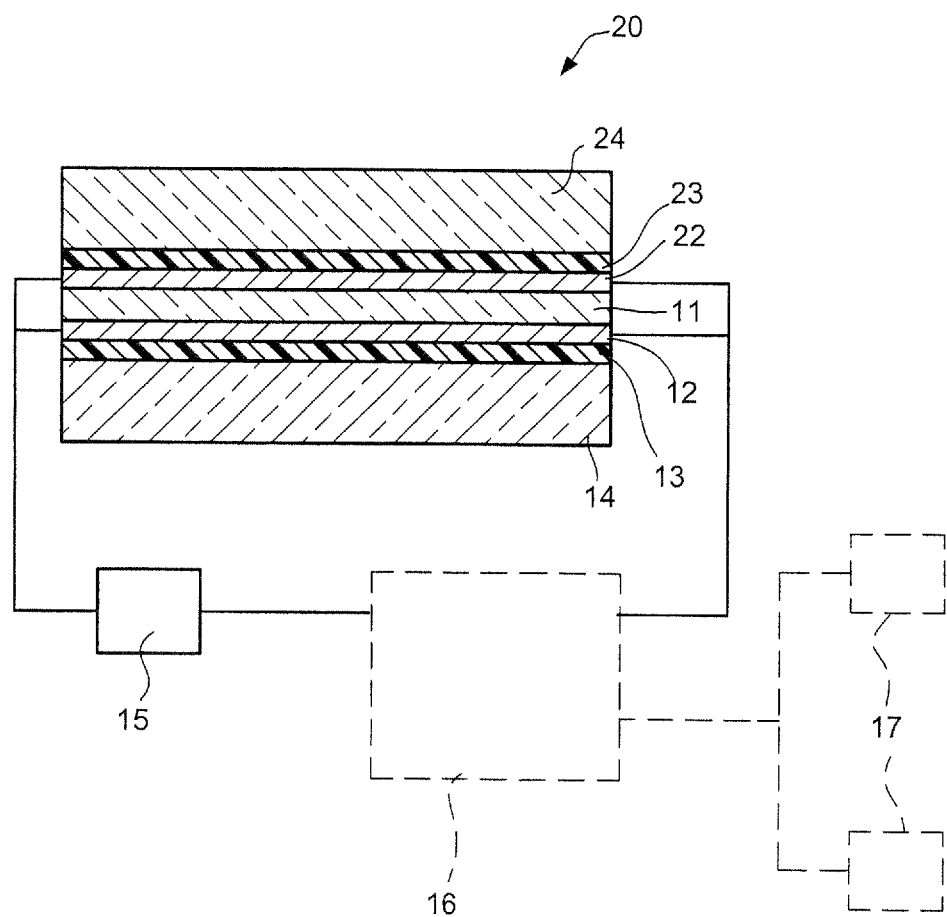
FIG. 2 is a diagram which illustrates a thermochromic window, according to other exemplary embodiments.

FIG. 2 is a diagram which illustrates thermochromic window 20, according to other exemplary embodiments.

Referring to FIG. 2, thermochromic window 20 includes first glass substrate 11, conductive film 12, silicone resin layer 13, second glass substrate 14, and power source 15, which were described in detail with reference to FIG. 1. Thermochromic window 20 also includes a second transparent conductive film 22, a second silicone resin layer 23, and a third glass substrate 24. In some exemplary embodiments, thermochromic window 20 may include controller 16 and one or more sensors 17, which were described in detail with reference to FIG. 1.

Second conductive film 22, second silicone resin layer 23, and third glass substrate 24 may have the same or similar properties/materials as/to conductive film 12, silicone resin layer 13, and second glass substrate 14, respectively, which were described in detail with reference to FIG. 1.

Second transparent conductive film 22 is electrically connected to power supply 15 in a similar manner as conductive film 12. Sensors 17, if included in thermochromic window 20, may, for example, sense the temperature of one or more of second conductive film 22, second silicone resin layer 23, third glass substrate 24, or the air outside third glass substrate 24 in a similar manner as was described above with reference to FIG. 1.

The single-sided configuration of thermochromic window 10 and the double-sided configuration of thermochromic window 20 each provide various advantages in construction and performance. For example, thermochromic window 20 allows for the use a thin first glass substrate 11, which enables thinner overall construction and improved control and reduced of temperature on outside of glass substrates 14 and 24. Note that first glass substrate 11 may be at least 1 mm thinner (more preferably at least 1.5 or 2 mm thinner) than second glass substrate 14 and/or glass substrate 24 in the FIG. 1 and/or FIG. 2 embodiments.

Figure 3:
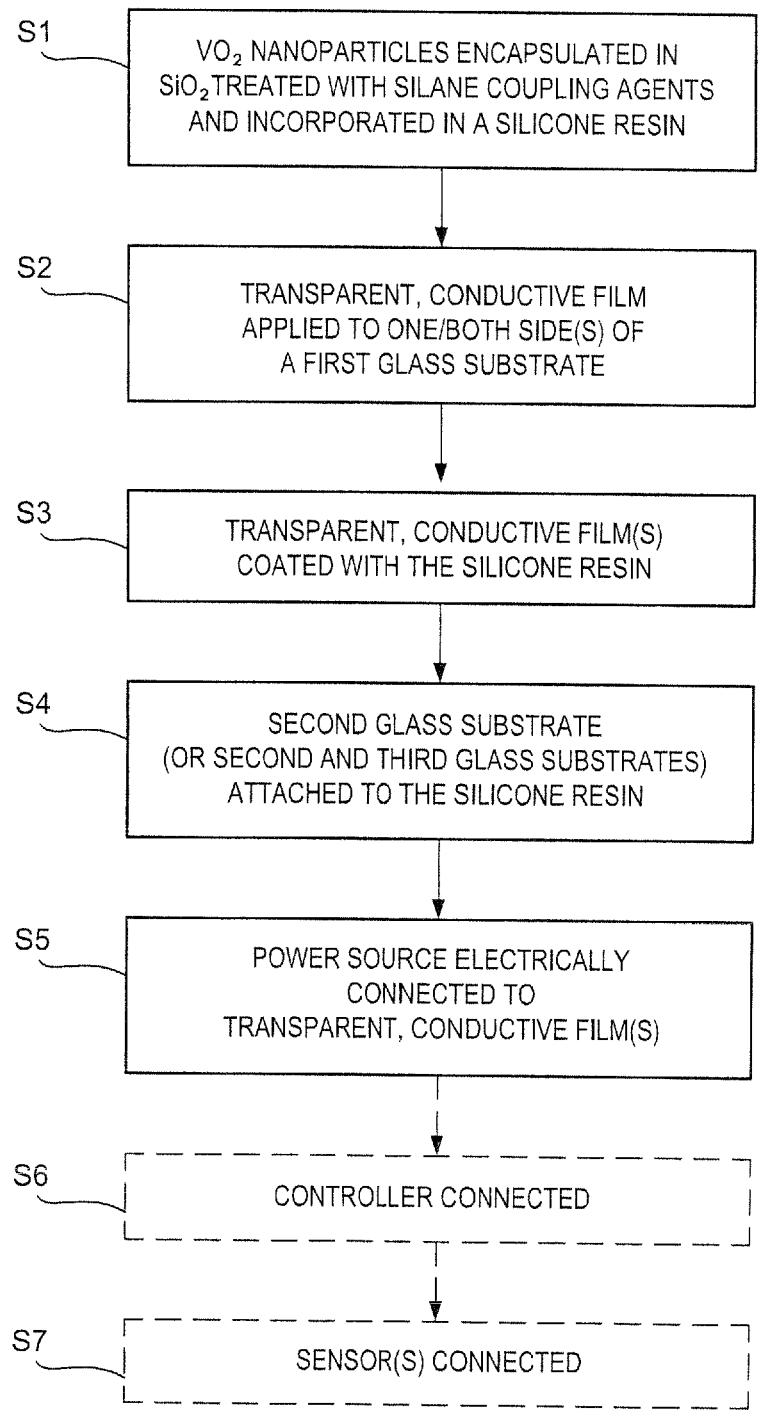
FIG. 3 is a flowchart which illustrates a method of manufacturing a thermochromic window, according to exemplary embodiments.

FIG. 3 is a flowchart which illustrates a method of manufacturing thermochromic window 10 and/or thermochromic window 20, according to exemplary embodiments.

$VO_2$ nanoparticles are encapsulated in $SiO_2$ and incorporated in a silicone resin in operation S1. During the process of encapsulating or substantially encapsulating the nanoparticles, the nanoparticles may be treated with silane(s) inclusive coupling agent(s).

A transparent, conductive film 12 is applied to one or both sides of a first glass substrate 11 in operation S2.

The transparent, conductive film(s) 12 is/are coated with the silicone resin layer 13 and/or 23 in operation S3, the silicone resin including the nanoparticles.

A second glass substrate 14 is attached to the silicone resin in operation S4. If two conductive films and silicone resin layers are present, a third glass substrate 24 is also added to the second silicone resin layer 23. In certain example embodiments, the silicone layer 13 (and/or 23) may be used as a laminating layer in order to laminate the glass substrates to one another. Alternatively, in addition to the silicone layer(s) 13 and/or 23, an additional laminating layer (e.g., PVB) may be located (e.g., between the substrate 14 and layer 13) in order to laminate the glass substrates to one another.

A power source 15 is electrically connected to the transparent, conductive film(s) in operation S5.

A controller which controls the power supplied by the power source is optionally connected in operation S6.

One or more sensors, which provide data to the controller is/are optionally connected in operation S7.

Thermochromic window 10 or 20 may be used in any application where high transparency and low infrared transmission is desirable. For example, thermochromic window 10 or 20 may be used in commercial window applications such as storefronts, facades, skylights, office buildings, etc. In commercial applications, infrared transmission control enables improved temperature control and lower energy costs. In residential application, thermochromic window 10 or 20 allows for natural lighting while reducing the need for window treatments and other coatings to reduce infrared transmission. Thermochromic window 10 or 20 may be incorporated in an insulated glass (IG) window unit to provide even greater energy efficiency.

In certain example embodiments of this invention, there is provided a window (e.g., thermochromic window) comprising: a first glass substrate; a transparent conductive film on the first glass substrate; a silicone inclusive layer, the silicone inclusive layer comprising nanoparticles comprising vanadium dioxide ($VO_2$) which are encapsulated and/or substantially encapsulated in a shell comprising silicon dioxide ($SiO_2$); a second glass substrate, wherein the transparent conductive film and the silicone inclusive layer are located between the first and second glass substrates; and a power source which supplies power to the transparent conductive film.

In the window of the immediately preceding paragraph, the power supplied to the conductive film may be used to cause the silicone inclusive layer to be heated to temperature sufficient to cause at least some of the nanoparticles comprising vanadium dioxide to transition from a monoclinic form to a rutile form, wherein the nanoparticles reflect more IR radiation in the rutile form than in the monoclinic form.

In the window of any of the preceding two paragraphs, the nanoparticles may be distributed in the silicone inclusive layer in a gradient with a higher concentration of the nanoparticles being near the conductive film.

In the window of any of the preceding three paragraphs, there may be a controller which controls an amount of power supplied by the power source to the conductive film. The controller may be configured to vary the amount of power based on settings by a user, and/or to vary the amount of power based on a time of day. There may also be one or more sensors which supply data to the controller. The data supplied by the one or more sensors may be temperature data. The controller may be configured to vary the amount of power supplied to the conductive film based on the temperature data.

In certain example embodiments of this invention, there is provided a thermochromic window comprising: a first substrate; a transparent conductive film on the first substrate; a laminating layer comprising insulating material, the laminating layer further including nanoparticles comprising vanadium which are encapsulated and/or substantially encapsulated in a shell; and a second substrate, wherein the transparent conductive film and the laminating layer are located between the first and second substrates.

The thermochromic window of the immediately preceding paragraph may further comprise a power source which supplies power to the transparent conductive film.

In the thermochromic window of any of the preceding two paragraphs, power supplied to the conductive film may be used to cause the nanoparticles comprising vanadium to be heated to temperature sufficient to cause at least some of the nanoparticles comprising vanadium to transition from a first state to a second state, the nanoparticles in the second state reflecting more IR than nanoparticles in the first state. The first state may be of or include a rutile form, and the second state may be of or include a monoclinic form.

In the thermochromic window of any of the preceding three paragraphs, the first substrate may be thinner than the second substrate.

In the thermochromic window of any of the preceding four paragraphs, the first and second substrates may comprise glass.

In the thermochromic window of any of the preceding five paragraphs, the nanoparticles may be of or include $VO_2$.

In the thermochromic window of any of the preceding six paragraphs, the insulating material of the laminating layer may be of or include silicone.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A window comprising:
   a first glass substrate;
   a transparent conductive film on the first glass substrate;
   a silicone inclusive layer, the silicone inclusive layer comprising nanoparticles comprising vanadium dioxide ($VO_2$) which are encapsulated and/or substantially encapsulated in a shell comprising silicon dioxide ($SiO_2$);
   a second glass substrate, wherein the transparent conductive film and the silicone inclusive layer are located between the first and second glass substrates;
   a power source which supplies power to the transparent conductive film, wherein the power supplied to the conductive film causes the silicone inclusive layer to be heated to temperature sufficient to cause at least some of the nanoparticles comprising vanadium dioxide to transition from a monoclinic form to a rutile form, wherein the nanoparticles reflect more IR radiation in the rutile form than in the monoclinic form.

2. The window of claim 1, wherein the nanoparticles are distributed in the silicone inclusive layer in a gradient with a higher concentration of the nanoparticles being near the conductive film.

3. The window of claim 1, further comprising a controller which controls an amount of power supplied by the power source to the conductive film.

4. The window of claim 3, wherein the controller is configured to vary the amount of power based on settings by a user.

5. The window of claim 3, wherein the controller is configured to vary the amount of power based on a time of day.

6. The window of claim 3, further comprising one or more sensors which supply data to the controller.

7. The window of claim 6, wherein the data supplied by the one or more sensors is temperature data.

8. The window of claim 7, wherein the controller is configured to vary the amount of power supplied to the conductive film based on the temperature data.

9. The window of claim 1, further comprising a third glass substrate, wherein another silicon inclusive layer including vanadium oxide inclusive nanoparticles is provided between the first and third glass substrates.

10. A thermochromic window comprising:
    a first glass substrate;
    a first conductive film on the first glass substrate, wherein the first conductive film is transparent;
    a second conductive film on the first glass substrate on a side of the first glass substrate opposite the first conductive film, wherein the second conductive film is transparent;
    a first silicone inclusive layer on and directly contacting the first conductive film;
    a second silicone inclusive layer on and directly contacting the second conductive film;
    a third glass substrate, wherein the second silicone inclusive layer is located between the first and third glass substrates; and
    a power source which supplies power to the first conductive film and the second conductive film,
    wherein the first silicone inclusive layer and the second silicone inclusive layer each comprise vanadium dioxide ($VO_2$) nanoparticles which are encapsulated in a silicon dioxide ($SiO_2$) shell.

11. The thermochromic window of claim 10, wherein the power supplied to the first conductive film and the second conductive film heats the first silicone inclusive layer and the second silicone inclusive layer to temperature sufficient to cause the $VO_2$ nanoparticles to transition from a monoclinic state to a rutile state.

12. The thermochromic window of claim 10, further comprising a controller which controls an amount of power supplied by the power source to the first conductive film and the second conductive film.

13. The thermoehromic window of claim 12, further comprising one or more sensors which supply data to the controller.

14. The thermochromic window of claim 13, wherein the data supplied by the one or more sensors is temperature data.

15. The thermochromic window of claim 14, wherein the controller is configured to vary the amount of power based on the temperature data.

16. A method of manufacturing a thermochromic window, the method comprising:
    encapsulating vanadium dioxide ($VO_2$) nanoparticles in coating comprising silicon dioxide ($SiO_2$) to form encapsulated $VO_2$ nanoparticles;
    incorporating the encapsulated $VO_2$ nanoparticles in a silicone resin;
    applying a transparent conductive film to a first glass substrate;
    applying the silicone resin including the nanoparticles to the transparent conductive film;
    coupling a second glass substrate to the first glass substrate, so that the transparent conductive film and the nanoparticles are provided between the first and second glass substrates; and
    the window being configured for connecting a power supply which supplies power to the conductive film, wherein the window is configured so that power supplied to the conductive film will cause the silicone resin including the nanoparticles to be heated to temperature sufficient to cause at least some of the $VO_2$ nanoparticles to transition from a monoclinic form to a rutile form, wherein the nanoparticles reflect more IR radiation in the rutile form than in the monoclinic form.

17. The method of claim 16, further comprising:
  connecting a controller which controls the power supplied by the power source to the conductive film.
18. The method of claim 17, further comprising:
  connecting one or more sensors which supply data to the controller.
19. The method of claim 18, wherein the data supplied by the one or more sensors is temperature data.

\* \* \* \* \*